United States Patent
Hogg et al.

(10) Patent No.: US 7,733,651 B2
(45) Date of Patent: Jun. 8, 2010

(54) HEAT SINK ARRANGEMENT, ELECTRIC MOTOR, HOUSING PART, AND SPRINGY CLIP

(75) Inventors: Mario Hogg, Stühlingen (DE); Bernhard Kaiser, Bonndorf (DE)

(73) Assignee: Dunkermotoren GmbH, Bonndorf/Schwarzwald (DE)

( * ) Notice: Subject to any disclaimer, the term of this patent is extended or adjusted under 35 U.S.C. 154(b) by 338 days.

(21) Appl. No.: 11/773,762

(22) Filed: Jul. 5, 2007

(65) Prior Publication Data

US 2008/0007916 A1  Jan. 10, 2008

(30) Foreign Application Priority Data

Jul. 6, 2006 (EP) ................... 06300763

(51) Int. Cl.
*H05K 7/20* (2006.01)
*H02K 21/26* (2006.01)

(52) U.S. Cl. .................. 361/704; 361/679.54; 361/707; 361/709; 361/710; 165/80.3; 165/185; 310/64; 310/154.14; 310/154.15

(58) Field of Classification Search ......... 361/702–712, 361/721–724; 165/80.2, 80.3, 104.33, 185; 165/47; 310/43, 64, 68 C, 69, 154.14, 154.15, 310/154.17, 154.27
See application file for complete search history.

(56) References Cited

U.S. PATENT DOCUMENTS

| 2,513,227 | A | * | 6/1950 | Wylie | 310/154.25 |
|---|---|---|---|---|---|
| 3,258,622 | A |   | 6/1966 | Gillespie | |
| 3,596,139 | A | * | 7/1971 | Walsh | 174/562 |
| 4,412,145 | A | * | 10/1983 | Voss et al. | 310/154.15 |
| 4,528,615 | A | * | 7/1985 | Perry | 361/722 |
| 4,580,072 | A | * | 4/1986 | Morishita | 310/154.15 |
| 4,587,449 | A | * | 5/1986 | West | 310/154.27 |
| 4,707,630 | A | * | 11/1987 | Tomite et al. | 310/154.12 |
| 4,712,030 | A | * | 12/1987 | Lakin et al. | 310/89 |
| 4,840,222 | A | * | 6/1989 | Lakin et al. | 165/47 |
| 4,851,727 | A |   | 7/1989 | Tanaka | |
| 5,250,866 | A | * | 10/1993 | Fukui et al. | 310/154.14 |
| 5,783,881 | A | * | 7/1998 | Best et al. | 310/68 C |
| 5,825,107 | A | * | 10/1998 | Johnson et al. | 310/64 |
| 5,959,386 | A | * | 9/1999 | Knight | 310/154.14 |
| 6,060,799 | A | * | 5/2000 | McManus et al. | 310/43 |
| 6,548,930 | B1 | * | 4/2003 | Marx et al. | 310/154.14 |
| 6,794,782 | B2 | * | 9/2004 | Mahfoudh et al. | 310/154.03 |

(Continued)

FOREIGN PATENT DOCUMENTS

DE  3721758 A * 1/1989

(Continued)

*Primary Examiner*—Michael V Datskovskiy
(74) *Attorney, Agent, or Firm*—Carmen Patti Law Group, LLC

(57) ABSTRACT

The invention relates to a heat sink arrangement with a heat sink element, with a cylindrical interior, in particular a housing of an electric motor or housing part for such, with power electronics integrated into the housing or housing part, with at least one electronics component attached to the heat sink element from inside, in which the heat sink element is a sector of a cylinder adapted to the cylindrical interior of the heat sink arrangement, and that a springy clip is present that presses onto the ends of the sector such that the heat sink element is pressed against the cylindrical interior by spreading, as well as to an electric motor, a housing part and a springy clip.

7 Claims, 2 Drawing Sheets

U.S. PATENT DOCUMENTS

| | | | |
|---|---|---|---|
| 6,927,522 B2 * | 8/2005 | Skofljanec | 310/239 |
| 7,161,268 B2 * | 1/2007 | Kaiser | 310/64 |
| 7,180,736 B2 * | 2/2007 | Glovatsky et al. | 361/688 |
| 2005/0285460 A1 | 12/2005 | Kaiser | |

FOREIGN PATENT DOCUMENTS

| | | |
|---|---|---|
| DE | 3721758 A1 | 12/1989 |
| FR | 1265409 A | 1/1961 |
| WO | WO96/38900 | * 12/1996 |

* cited by examiner a                                          b

HEAT SINK ARRANGEMENT, ELECTRIC MOTOR, HOUSING PART, AND SPRINGY CLIP

BACKGROUND OF THE INVENTION

The invention is based on a priority application EP06300763.7 which is hereby incorporated by reference.

The invention relates to a heat sink arrangement according to the preamble of claim 1, to an electric motor according to the preamble of claim 6, to a housing part according to the preamble of claim 7 and to a springy clip.

Such heat sink arrangement is known e.g. from US 2005/0285460 A1.

To assemble such heat sink arrangement is not easy because two elements have to be inserted at one and the same time.

Here the invention gives a remedy by a heat sink arrangement according to the teaching of claim 1, by an electric motor according to the teaching of claim 6, by a housing part according to the teaching of claim 7 and by a springy clip according to the teaching of claim 8.

SUMMARY OF THE INVENTION

The invention is based on the insight, that often we do not have such a lot of power electronic elements that they really need the full circumference as contact area of the heat sink element to the housing. So we use only a sector thereof and by spreading its ends press it to the housing.

Further embodiments will become apparent from the depending claims and from the detailed description.

This invention gives a further degree in design freedom. In a preferred embodiment it is possible to use the extra space gained here to apply connectors for the motor and its electronics.

BRIEF DESCRIPTION OF THE DRAWINGS

In the following the invention will be described in further detail:

FIG. 1 shows the major part of an exemplary embodiment of a heat sink arrangement according to the invention. We see a heat sink element carrying four pairs of power electronic elements riveted thereto and a springy clip for spreading the heat sink element.

All this together has the outer shape of a circular cylinder. Thus it can be assembled into a cylindrical interior of whatever element acting as the proper real sink. In the starting point of the invention this is the housing of an electric motor or a housing part for such, depending on whether the power electronic of such motor has its own housing or is integrated into the housing of the motor. In the letter case the whole housing of the motor acts as heat sink. As the housings of such electric motors often are made as strand casting parts they automatically have the same interior shape as has the stator part of the motor as an outer shape. This needs not necessarily be a circle but it also could be a regular polygon.

Figure 2:
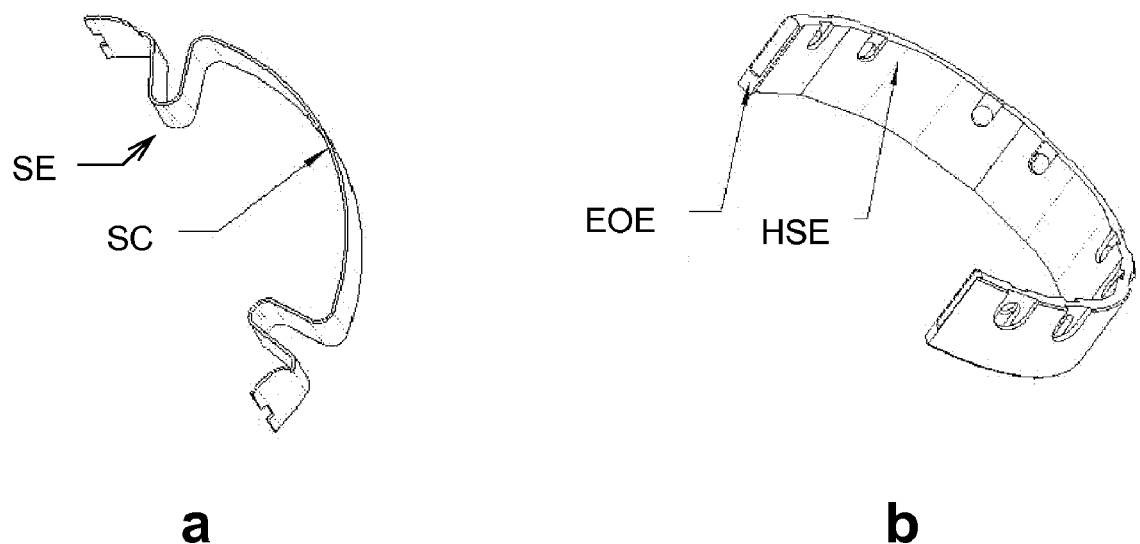
FIG. 2 shows the major elements of the embodiment of FIG. 1 of a heat sink arrangement according to the invention, namely a springy clip under a) and a heat sink element under b).

FIG. 2 shows the two main parts in separate views, namely a springy clip SC in FIG. 2a, and a heat sink element HSE in FIG. 2b.

The springy clip SC roughly has the outer shape of a sector of a circular cylinder. Two springy elements SE, here shown as inwardly bent convex parts, have the effect of causing outwardly acting forces which, when applied to the heat sink element of FIG. 2b tries to spread this element HSE. Such springy clip could be made by way of punching out of a metal sheet of a suitable material.

Such springy clip needs not necessarily have the outer shape of a sector of a circular cylinder, but could have a more straight elongated form, of course with some kind of springy element. The form preferred in an embodiment may depend on where it disturbs least.

The heat sink element HSE of FIG. 2b shows a number of plane faces, each apt to receive a power electronic component like a power transistor or a thyristor. We also see recesses from the internal as well as from the external surface of the heat sink element, and holes between the recesses. These recesses and holes allow for the mentioned riveting of the power electronic components. Instead of riveting also screwing or soldering could be used for fixing the components, This could result from the available tools. Recesses and holes would have to be adapted thereto.

Figure 1:
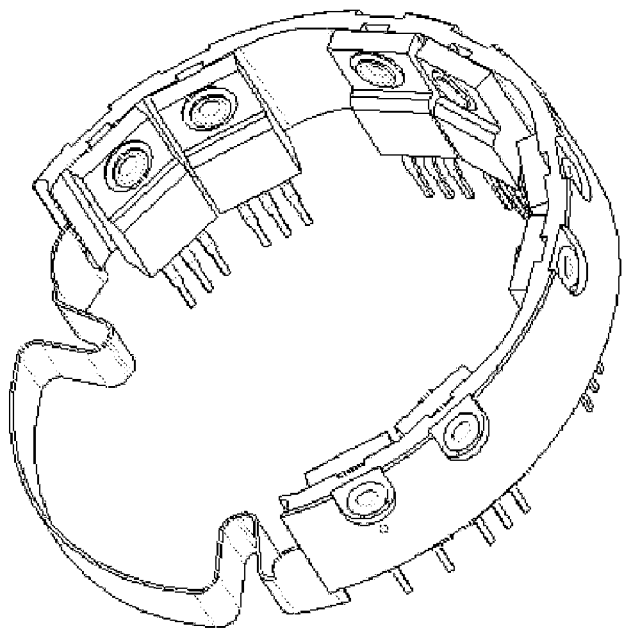
FIG. 1 shows a typical part of an embodiment of a heat sink arrangement according to the invention.

In our preferred solution the ends EOE of the heat sink element are adapted to receive the springy clip. On the one hand there are recesses to guide the springy clips, maybe better to be seen in FIG. 1 and on the other hand there are planes for applying the springy forces.

Figure 3:
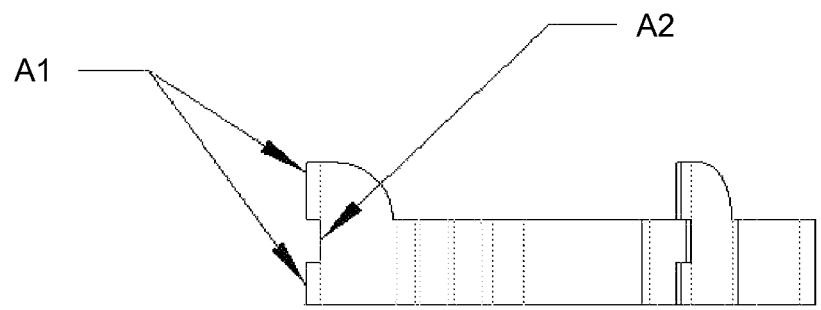
FIG. 3 shows another view of the springy clip of FIG. 2b.

The ends EOE of the heat sink element better can be seen in the view of FIG. 3. These ends have outwardly bending areas A1 for being guided and an area A2 in between for applying the springy forces.

The view of FIG. 3 also shows another preferred characteristic of such springy clip SC. The ends are higher than the strip between. So the body of the springy clip SC is less extended lengthwise, in the direction of the cylinder, than the heat sink element, to which only the ends EOE of the springy element are adapted. Even a low body of the springy clip SC will reach for applying the necessary forces. So there will remain extra space for other purposes.

Figure 4:
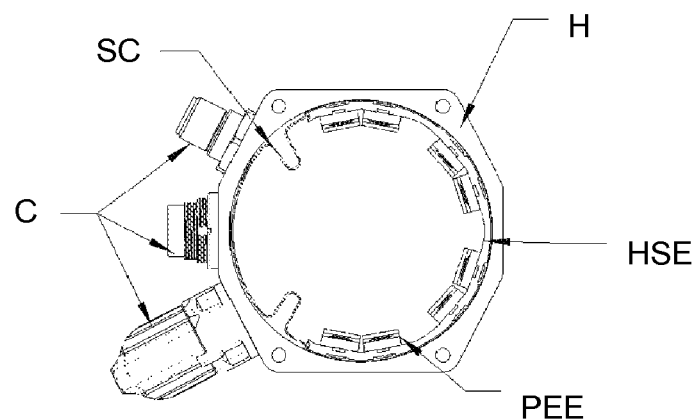
FIG. 4 shows an example of an embodiment of a heat sink arrangement according to the invention seen from above.
Figure 5:
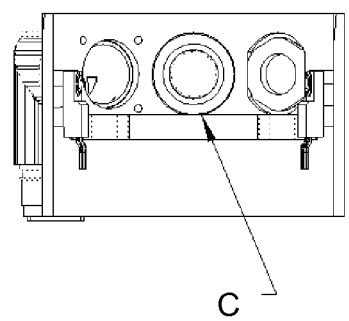
FIG. 5 shows another view of the embodiment of FIG. 4, namely a cross-section with the view towards the springy clip and the connectors.

This will become more clear in connection with FIGS. 4 and 5.

FIG. 4 shows a full example of a heat sink arrangement according to the invention. From above we see a housing H with the typical form of the housing of an electric motor, the heat sink elements HSE with four pairs of power electronic elements PEE, and the springy clip SC. We also see three different connectors C.

In FIG. 5 we see how the connectors C reach into the room between the power electronic elements PEE, but are not hindered by the springy clip because of its lower design.

The invention claimed is:

1. A heat sink arrangement with a heat sink element, with a cylindrical interior, in particular a housing of an electric motor or housing part for such, with power electronics integrated into the housing or housing part, with at least one electronics component attached to the heat sink element from inside, wherein the heat sink element is a sector of a cylinder adapted to the cylindrical interior of the heat sink arrangement, and a springy clip is present that presses onto the ends of the sector such that the heat sink element is pressed against the cylindrical interior by spreading, and wherein the ends have outwardly bending areas for being guided.

2. The heat sink arrangement according to claim 1, wherein the springy clip builds approximately a cylinder together with the heat sink element, in which the springy dip possesses at least one convexity inwards, that effects the spreading.

3. The heat sink arrangement according to claim 1, wherein the heat sink element carries recesses at its ends for engaging of the ends of the springy clip.

4. The heat sink arrangement according to claim 1, wherein the heat sink element has flat surfaces on its internal side for pressing on electronics components.

5. The heat sink arrangement according to claim 1, wherein the springy clip is less extended lengthwise than is the heat sink element.

6. Electric motor with housing and power electronics integrated into the housing, wherein the housing is constructed as a heat sink arrangement according to claim 1.

7. Housing part for adding to an electric motor, with integrated power electronics for this, wherein the housing part is constructed as a heat sink arrangement according to claim 1.

* * * * *